United States Patent [19]

Hofmann et al.

[11] Patent Number: 5,229,090
[45] Date of Patent: Jul. 20, 1993

[54] PROCESS FOR NITROGEN OXIDES REDUCTION TO LOWEST ACHIEVABLE LEVEL

[75] Inventors: John E. Hofmann, Naperville; William H. Sun, Aurora, both of Ill.

[73] Assignee: Nalco Fuel Tech, Naperville, Ill.

[21] Appl. No.: 725,183

[22] Filed: Jul. 3, 1991

[51] Int. Cl.$^5$ .................... C01B 17/00; C01B 21/00; B01J 8/00
[52] U.S. Cl. ................................................ 423/235
[58] Field of Search .................. 423/235, 235 D, 239, 423/239 A

[56] References Cited

U.S. PATENT DOCUMENTS

| | | |
|---|---|---|
| 3,900,554 | 8/1975 | Lyon . |
| 4,208,386 | 6/1980 | Arand et al. . |
| 4,325,924 | 4/1982 | Arand et al. . |
| 4,624,840 | 11/1986 | Dean et al. ........................ 423/235 |
| 4,719,092 | 1/1988 | Bowers . |
| 4,751,065 | 6/1988 | Bowers . |
| 4,770,863 | 9/1988 | Epperly et al. . |
| 4,777,024 | 10/1988 | Epperly et al. . |
| 4,780,289 | 10/1988 | Epperly et al. . |
| 4,803,059 | 2/1989 | Sullivan et al. . |
| 4,844,878 | 7/1989 | Epperly et al. . |
| 4,863,704 | 9/1989 | Epperly et al. . |
| 4,863,705 | 9/1989 | Epperly et al. . |
| 4,873,066 | 10/1989 | Epperly et al. . |
| 4,877,591 | 10/1989 | Epperly et al. . |
| 4,888,165 | 12/1989 | Epperly et al. . |
| 4,902,488 | 2/1990 | Epperly et al. ..................... 423/235 |
| 4,997,631 | 3/1991 | Hofmann et al. . |
| 5,057,293 | 10/1991 | Epperly et al. ..................... 423/235 |

FOREIGN PATENT DOCUMENTS

WO87/02025  10/1986  PCT Int'l Appl. .
WO89/02780  8/1988  PCT Int'l Appl. .

OTHER PUBLICATIONS

Fenimore, "Destruction of NO by $NH_3$ in Lean Burnt Gas," Combustion and Flame 37: 245–250 (1980).
Sun, Hofmann, and Pachaly, "Post Combination $NO_x$ Reduction With Urea: Theory and Practice," 7th Annual International Pittsburgh Coal Conference, Sep. 10–14, 1990.

Primary Examiner—Gregory A. Heller
Attorney, Agent, or Firm—St. Onge Steward Johnston & Reens

[57] ABSTRACT

A system for the reduction of nitrogen oxides in the effluent from the combustion of a carbonaceous fuel is presented. This system utilizes means for determining the lowest achievable nitrogen oxides concentration with respect to a treatment agent to be introduced into the effluent; means for determining whether the baseline nitrogen oxides concentration at the point of introduction is above the lowest achievable nitrogen oxides concentration; and means for introducing the treatment agent into the effluent under conditions effective to reduce the effluent nitrogen oxides concentration.

9 Claims, 3 Drawing Sheets

PROCESS FOR NITROGEN OXIDES REDUCTION TO LOWEST ACHIEVABLE LEVEL

TECHNICAL FIELD

The present invention relates to a system for reducing nitrogen oxides ($NO_x$, where x is a positive integer, generally 1 of 2) in the effluent from the combustion of a carbonaceous fuel. The inventive system avoids the application of fruitless and counterproductive $NO_x$-reducing treatment processes. It also enables the practitioner to achieve nitrogen oxides reductions in situations previously thought infeasible.

Nitrogen oxides are troublesome pollutants which are found in the combustion effluent streams of boilers and comprise a major irritant in smog. It is further believed that nitrogen oxides can undergo a process in the troposhere known as photo-chemical smog formation through a series of reactions in the presence of sunlight and hydrocarbons. Moreover, nitrogen oxides comprise a significant contributor to acid rain and have been implicated in the depletion of the ozone layer of the stratosphere. Nitrogen oxides may also be a contributor to the undesirable warming of the atmosphere known as the "greenhouse effect".

Efforts have long been under way to develop selective, non-catalytic nitrogen oxides reduction (SNCR) processes because of the efficiency and economy of such processes Non-catalytic processes often have the drawback, though, of being extremely temperature dependent and were long believed to be non-applicable in "high temperature" applications, such as in situations where the temperature of the effluent being treated is above 2100° F. In such situations, it had been thought that only burner modifications (which are limited in usefulness) could be used to reduce $NO_x$ when the temperatures are so high Due to boiler geometry and other considerations, it is often possible to introduce treatment agents only in selected locations in a boiler If such locations are at temperatures where commonly used nitrogen oxides processes were considered infeasible, it was believed that significant $NO_x$ reductions could not be achieved.

What is desired, therefore, is a system whereby nitrogen oxides reductions can be achieved even in situations where they were thought infeasible, such as at temperatures above 2100° F., as well as a system whereby the introduction of $NO_x$ reducing treatment agents in counterproductive situations can be avoided

BACKGROUND ART

Processes and compositions for the reduction of nitrogen oxides in combustion effluents have been developed extensively over recent years. With the increased attention to the health risks and environmental damage caused by agents such as smog and acid rain, it is expected that $NO_x$ reduction research will continue to be pursued.

In the past, most processes for reducing nitrogen oxides levels in oxygen rich effluents have concentrated on achieving $NO_x$ reductions at temperatures below 2100° F. and especially below 2000° F. Most notable among these processes is that disclosed by Arand et al. in U.S. Pat. No. 4,208,386 which details the reduction of $NO_x$ in combustion effluents by introducing urea at temperatures between 1300° F. and 2000° F. The Arand et al. process has been significantly improved by disclosures such as U.S Pat. Nos. 4,751,065, 4,719,092, and 4,927,612, all to Bowers, U.S. Pat. No. 4,803,059 to Sullivan and Epperly, U.S. Pat. Nos. 4,844,878 to Epperly, Sullivan, and Sprague, 4,863,705 to Epperly, Sullivan, and Sprague, 4,873,066 to Epperly, Sullivan, and Sprague, 4,877,591 to Epperly and Sullivan, and 4,888,165 to Epperly and Sullivan. Each of these patents teaches the use of certain chemical "enhancers", useful themselves and which also shift the temperature range in which urea is most effective when they are used in conjunction with urea. Also disclosed are special techniques, such as cooling the effluent or highly diluting the treatment agent, which permit introduction at higher temperatures.

Other processes which improve upon the basic Arand et al. urea process are disclosed by U.S. Pat. Nos. 4,777,024 to Epperly, Peter-Hoblyn, Shulof, Jr., and Sullivan and 4,780,289 to Epperly, O'Leary, and Sullivan. These processes each involve introducing certain treatment agents using methods designed to maximize $NO_x$ reductions while minimizing the production or generation of other pollutants such as ammonia or carbon monoxide In other words, these patents teach processes which impact on the overall efficiency of the disclosed nitrogen oxides reducing processes. Although potentially effective at higher temperatures, these patents do not disclose particular treatment agents or conditions useful for the reduction of $NO_x$ at temperatures above 2100° F.

DISCLOSURE OF INVENTION

An object of the present invention is to provide a process which can utilize the lowest achievable nitrogen oxides concentration for an effluent in order to achieve the reduction of nitrogen oxides.

Another object of the present invention is the use of the lowest achievable nitrogen oxides concentration for the effluent and introduced treatment agent by determining the difference between the actual nitrogen oxides concentration and the lowest achievable nitrogen oxides concentration and introducing the treatment agent to reduce the nitrogen oxides concentration at least partially towards the lowest achievable nitrogen oxides concentration.

It is also an object of the present invention to determine the amount of nitrogen oxides reductions possible in a given effluent location using a given treatment agent by determining the lowest achievable nitrogen oxides concentration, measuring the actual nitrogen oxides concentration and then subtracting the lowest achievable concentration from the actual to determine the potential reduction.

These and other objects which will be readily apparent to the skilled artisan can be accomplished by the application of the process of the present invention as described in more detail herein below.

BRIEF DESCRIPTION OF THE DRAWINGS

The objects of this invention will be described and the present invention better understood and its advantage more apparent in view of the following detailed description, especially when read with reference to the appended drawings, wherein.

BEST MODE FOR CARRYING OUT THE INVENTION

Figure 1:
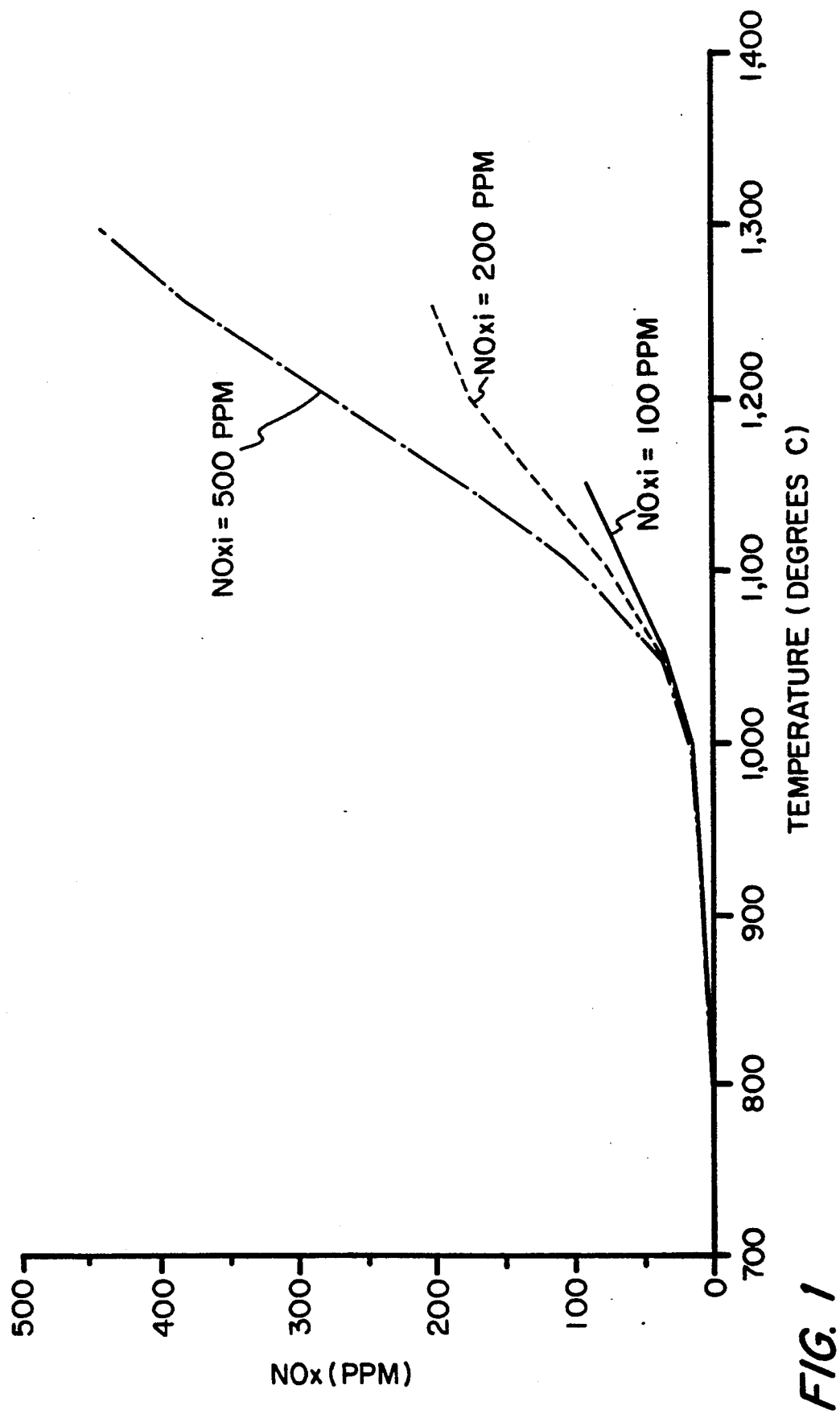
FIG. 1 is a graphical illustration of the critical nitrogen oxides concentration at three baseline nitrogen oxides levels ($NO_{xi}$)

The introduction of nitrogenous compositions, by which is meant compositions having at least one component containing nitrogen as an element thereof, for $NO_x$ reduction comprises a selective, free radical-mediated process, often referred to as selective non-catalytic reduction (SNCR) Suitable nitrogenous compositions for use as a $NO_x$-reducing treatment agent include cyanuric acid, ammonia such as disclosed by Lyon in U.S. Pat. No. 3,900,554, and urea such as disclosed by Arand et al. in either of U.S. Pat. Nos. 4,208,386 and 4,325,924, the disclosures of each of which are incorporated herein by reference.

Additional appropriate nitrogenous treatment agents and methods known as being effective for the reduction of nitrogen oxides include those disclosed by International Patent Application entitled "Reduction of Nitrogen- and Carbon-Based Pollutants Through the Use of Urea Solutions", having Publication No. WO 87/02025, filed in the name of Bowers on Oct. 3, 1986; U.S. Pat. No. 4,751,065 in the name of Bowers; U.S. Pat. No. 4,719,092, to Bowers; U.S Pat. No. 4,927,612, also to Bowers; U.S. Pat. No. 4,770,863 to Epperly and Sullivan; U.S. Pat. No. 4,888,165 to Epperly and Sullivan; U.S Pat. No. 4,877,591 to Epperly and Sullivan; U.S. Pat. No. 4,803,059 to Sullivan and Epperly; U.S. Pat. No. 4,863,705 to Epperly, Sullivan, and Sprague; U.S. Pat. No. 4,844,878 to Epperly, Sullivan, and Sprague; U.S. Pat. No. 4,770,863 to Epperly and Sullivan; International Patent Application entitled "Composition for Introduction into a High Temperature Environment", having Publication No. WO 89/10182, filed in the names of Epperly, Sprague, and von Harpe on Apr. 28, 1989; U.S. Pat. No. 4,902,488 to Epperly, O'Leary, Sullivan, and Sprague; U.S. Pat. No. 4,863,704 to Epperly, Peter-Hoblyn, Shulof, Jr., Sullivan, and Sprague; U.S. Pat. No. 4,873,066 to Epperly, Sullivan, and Sprague; copending and commonly assigned U.S. patent application entitaled "Hybrid Process for Nitrogen Oxides Reduction", having Ser. No. 07/395,810, filed in the names of Epperly and Sprague on Aug. 18, 1989; U.S. Pat. No. 4,997,631 to Hofmann, Sprague, and Sun; and copending and commonly assigned U.S. patent application entitled "Process for the In-Line Hydrolysis of Urea", having Ser. No. 07/561,154, filed in the names of von Harpe and Pachaly on Aug. 1, 1990, the disclosures of each of which are incorporated herein by reference.

These patents and applications contemplate the use of treatment agents which comprise urea (or one or more of its hydrolysis products such as ammonium carbamate, ammonium carbonate, ammonium bicarbonate, ammonia and mixtures or complexes thereof) or ammonia (or compounds which produce ammonia as a by-product such as ammonium salts like ammonium formate and ammonium oxalate), as well as other compositions such as hexamethylenetetramine (HMTA), oxygenated hydrocarbons such as ethylene glycol, ammonium salts of organic acids such as ammonium acetate and ammonium benzoate, heterocyclic hydrocarbons having at least one cyclic oxygen such as furfural, sugar, molasses, 5- or 6-membered heterocyclic hydrocarbons having at least one cyclic nitrogen such as pyridine and pyrolidine, hydroxy amino hydrocarbons such as milk or skimmed milk, amino acids, proteins and monoethanolamine and various other compounds which are disclosed as being effective at the reduction of nitrogen oxides in an effluent. Also contemplated are mixtures of urea or ammonia with the other disclosed compositions as enhancers therefor.

As taught by U.S. Pat. No. 4,780,289 to Epperly, O'Leary, and Sullivan (the disclosure of which is hereby incorporated by reference), each known $NO_x$ reducing treatment agent is effective in accordance with a nitrogen oxides reduction versus effluent temperature curve, which is typically unique to the combustor in which the effluent is produced Each such curve has a characteristic shape, with a left side which denotes the effluent temperatures where increasing temperature corresponds to increasing $NO_x$ reductions, and a right side which denotes the effluent temperatures where increasing temperature corresponds to decreasing $NO_x$ reductions. Each nitrogen oxides reduction versus effluent temperature curve also includes what can generally be referred to as a curve plateau where temperature increases do not correspond to a significant change in the amount of $NO_x$ reduction realized.

The curve plateau is that portion of the curve where the highest 20% of nitrogen oxides reduction values are found, when compared with values at other portions of the curve, especially the highest 10% of $NO_x$ reduction values. The curve plateau represents the effluent temperature range in which the achievable $NO_x$ reductions realized by introduction of the particular treatment agent are maximized.

As noted, when treatment agents are introduced at temperatures below the temperature range within the curve plateau (i.e., on the left side of the $NO_x$ reduction versus effluent treatment curve), achievable $NO_x$ reductions increase with increasing effluent temperature at the point of introduction of the treatment agent. Contrariwise, at temperatures on the right side of the curve, above the temperature range within the curve plateau, achievable $NO_x$ reductions decrease with increasing temperature at the point of introduction.

It has been found that any introduction further to the right than a previous introduction (i.e., at a higher effluent temperature) will result in decreased concentration of secondary pollutants such as ammonia ($NH_3$) and carbon monoxide (CO) In the case of nitrous oxide ($N_2O$), also considered a secondary pollutant, $N_2O$ levels increase until the point where peak $NO_x$ reductions are achieved. The $N_2O$ levels then decrease rapidly. In fact, on the right side of the plateau, and on the right side of the curve as a whole, the emissions of secondary pollutants are generally minimized.

The shape of the nitrogen oxides reduction versus effluent temperature curve for any particular treatment agent is the result of the reaction kinetics of the nitrogen oxides reducing reaction in the effluent. It is believed that in most cases there are two competing reaction paths taking place In one of these, the treatment agent combines with hydroxyl radicals (OH) in the effluent to form nitrogen oxides (and thus increase $NO_x$ levels). In the competing path the treatment agent reacts with hydroxyl radicals and nitrogen oxides in the effluent to form $N_2$ (and thus decrease $NO_x$ levels). These two reaction paths can be summarized with respect to urea as the treatment agent by the following:

$$CO(NH_2)_2 \text{ and } OH \rightarrow NO_x \qquad (I)$$

$$CO(NH_2)_2, OH \text{ and } NO_x \rightarrow N_2 \qquad (II)$$

At the left side of nitrogen oxides reduction versus effluent temperature curve, both pathways I and II are relatively slow due to the low temperature of the effluent as well as the low concentration of hydroxyl radicals at such low temperatures. Thus, the level of nitrogen oxides reduction is not very great and byproduct (e.g. $NH_3$ and CO emissions are high. Because the overall rate of pathway II is faster than that of pathway I at these temperatures, the $NO_x$ concentration will be reduced somewhat, if a sufficiently long reaction time (i.e., residence time) is available.

As temperatures increase, the rate of pathway II increases while pathway I still lags behind. Because of this, the nitrogen oxides concentration is reduced to a greater extent but byproduct emissions remain significant because residence time is generally not adequate for the reactions to fully utilize injected treatment agents. If increased residence time is available, both increased $NO_x$ reductions and lower byproduct emissions will be observed.

If the effluent temperature at the point of introduction is within the "plateau" region, the rate of pathway II is increased significantly and the rate of pathway of I is negligible. Because of this, emissions of byproducts are less than those on the left side and chemical utilization is at its maximum with resultant significant $NO_x$ reductions. When the effluent introduction temperature is higher still, and on the right side, off the plateau, pathway I becomes more significant and both pathways I and II begin competing for the reagents available.

Since the rates of both pathways I and II are extremely fast at such temperatures, the limitation for $NO_x$ reductions is not residence time or treatment agents used, but the ratio of the rates of pathways I and II, provided that sufficient reagents are present. Throughout the $NO_x$ reduction versus effluent temperature curve for a given treatment agent, it is this ratio which determines the lowest achievable $NO_x$ concentration This concentration is also referred to as critical $NO_x$, as first proposed by Fenimore in "Destruction of NO by $NH_3$ in Lean Burnt Gas", Combustion and Flame, 37:245-250 (1980).

When the amount of $NO_x$ present in the effluent is at or below this lowest achievable nitrogen oxides concentration, neither an increase in residence time nor treatment rate to provide an excess (e.g., beyond a 50% excess) of the stoichiometric amount will lower the $NO_x$ concentration any further Indeed, this may substantially increase the generation of secondary pollutants. In other words, unless the baseline $NO_x$ level, that is the nitrogen oxides concentration in the effluent prior to any treatment which is to be effected, is above the critical $NO_x$ level, treatment agent introductions are fruitless at best.

It has been found that the concentration of $NO_x$ which is the lowest achievable nitrogen oxides concentration increases sharply with temperature, especially at effluent temperatures above about 1900° F. When this "critical" $NO_x$ level is higher than baseline (or existing) nitrogen oxides levels for any particular application, chemical treatments will serve to actually increase the concentration of nitrogen oxides to this critical level. Clearly, this is counterproductive.

There is a lowest achievable $NO_x$ concentration for virtually all nitrogenous treatment agents, each of which have similar reaction pathways corresponding to pathways I and II, as known to the skilled artisan Besides urea, this also applies, inter alia, to ammonia ($NH_3$), commonly employed for nitrogen oxides reductions. The lowest achievable nitrogen oxides concentration varies with the particular treatment agent to be introduced as well as effluent conditions such as temperature, baseline concentration of $NO_x$, and concentration of CO, since each combination of treatment agent and effluent conditions has specific reaction kinetics associated therewith.

Ideally, it would be desirable to determine the critical nitrogen oxides level, e.g. calculate it, as a function of temperature, carbon monoxide (which, in part, determines the presence of hydroxyl radicals), oxygen level, baseline $NO_x$ level, and the ratio of carbon to hydrogen in the fuel being burned Although the critical $NO_x$ level can be measured experimentally, the task of evaluating the effects of all the parameters is time consuming and difficult because of limitations with experimental combustors. Instead, a computer model with a theoretical kinetic mechanism describing the reduction of nitrogen oxides by the desired treatment agent is advantageously utilized.

For instance, nitrogen oxides reduction by urea is believed to proceed through complex chemical reactions with each step an elementary reaction These reactions have been compiled by many in the field of combustion kinetics. Notably, J. A. Miller and C. T. Bowman have researched and focused on high temperature reactions of nitrogen containing compounds including $NO_x$ (Miller, J. A., Bowman, C. T., "Mechanism and Modeling of Nitrogen Chemistry in Combustion", Fall Meeting of the Western States Section/The Combustion Institute, Dana Point, Calif., October, 1988). Among the reactions reported, the following set is incorporated in the current model:

1. $H_2 + O_2 = 2OH$
2. $OH + H_2 = H_2O + H$
3. $O + OH = O_2 + H$
4. $O + H_2 = OH + H$
5. $H + O_2 + M = HO_2 + M$
6. $OH + HO_2 = H_2O + O_2$
7. $H + HO_2 = 2OH$
8. $O + HO_2 = O_2 + OH$
9. $2OH = O + H_2O$
10. $2H + M = H_2 + M$
11. $2H + H_2 = 2H_2$
12. $2H + H_2O = H_2 + H_2O$
13. $H + OH + M = H_2O + M$
14. $H + O + M = OH + M$
15. $2O + M = O_2 + M$
16. $H + HO_2 = H_2 + O_2$
17. $2HO_2 = H_2O_2 + O_2$
18. $H_2O_2 + M = 2OH + M$
19. $H_2O_2 + H = HO_2 + H_2$
20. $H_2O_2 + OH = H_2O + HO_2$
21. $NH + O_2 = HNO + O$
22. $NH + O_2 = NO + OH$
23. $NH + NO = N_2O + H$
24. $N_2O + H = N_2 + OH$
25. $N_2O + M = N_2 + O + M$
26. $N_2O + O = N_2 + O_2$
27. $N_2O + O = 2NO$
28. $N_2O + OH = N_2 + HO_2$

29. $NH+OH=HNO+H$
30. $NH+OH=N+H_2O$
31. $NH+N=N_2+H$
32. $NH+H=N+H_2$
33. $NH+O=NO+H$
34. $NH_2+O=HNO+H$
35. $NH_2+O=NH+OH$
36. $NH_2+OH=NH+H_2O$
37. $NH_2+H=NH+H_2$
38. $NH_2+NO=NNH+OH$
39. $NH_2+NO=N_2+H_2O$
40. $NH_3+OH=NH_2+H_2O$
41. $NH_3+H=NH_2+H_2$
42. $NH_3+O=NH_2+OH$
43. $NNH=N_2+H$
44. $NNH+NO=N_2+HNO$
45. $NNH+H=N_2+H_2$
46. $NNH+OH=N_2+H_2O$
47. $NNH+NH_2=N_2+NH_3$
48. $NNH+NH=N_2+NH_2$
49. $NNH+O=N_2O+H$
50. $HNO+M=H+NO+M$
51. $HNO+OH=NO+H_2O$
52. $HNO+H=H_2+NO$
53. $HNO+NH_2=NH_3+NO$
54. $2NHO=N_2O+H_2O$
55. $HNO+NO=N_2O+HO$
56. $N+NO=N_2+O$
57. $N+O_2=NO+O$
58. $N+OH=NO+H$
59. $HO_2+NO=NO_2+OH$
60. $NO_2+H=NO+OH$
61. $NH_2+NH=N_2H_2+H$
62. $2NH=N_2+2H$
63. $NH_2+N=N_2+2H$
64. $N_2H_2+M=NNH+H+M$
65. $N_2H_2+H=NNH+H_2$
66. $N_2H_2+O=NH_2+NO$
67. $N_2H_2+O=NNH+OH$
68. $N_2H_2+OH=NNH+H_2O$
69. $N_2H_2+NO=N_2O+NH_2$
70. $N_2H_2+NH=NNH+NH_2$
71. $N_2H_2+NH_2=NH_3+NNH$
72. $2NH_2=N_2H_2+H_2$
73. $NH_2+O_2=HNO+OH$
74. $CO+O+M=CO_2+M$
75. $CO+OH=CO_2+H$
76. $CO+O_2=CO_2+O$
77. $HO_2+CO=CO_2+OH$
78. $2H+CO_2=H_2+CO_2$
79. $NCO+H=NH+CO$
80. $NCO+O=NO+CO$
81. $NCO+N=N_2+CO$
82. $NCO+OH=NO+CO+H$
83. $NCO+M=N+CO+M$
84. $NCO+NO=N_2O+CO$
85. $NCO+H_2=HNCO+H$
86. $HNCO+M=NH+CO+M$
87. $H+HNCO=NH_2+CO$
88. $NH+HNCO=NH_2+NCO$
89. $NH_2+HNCO=NH_3+NCO$
90. $OH+HNCO=NCO+H_2O$
91. $O+HNCO=NH+CO_2$
92. $CON_2H_4=NH_3+HNCO$

The model developed assimilates reaction rates and thermodynamic data using a library of gas-phase subroutines developed at the Sandia National Laboratories (Kee, R. J., Miller, J. A., Jefferson, T. H., "CHEMKIN A General Purpose, Problem-Independent, Transportable, Fortran Chemical Kinetics Code Package", Sandia Laboratories Report #SAND80-8003, Livermore, Calif., 1980).

This model describes an ideal plug flow, i.e., no temperature or species concentration gradient in radial direction and no back-mixing. Species concentrations with this type of flow are described by a set of nonlinear ordinary differential equations. The number of equations depends on the number of species being modelled, and the equations are interrelated through rates of the reactions shown above. The resulting set of differential equations are integrated simultaneously using a numerical integrator (Hindmarsh, A. C., "ODEPACK, A Systematized Collection of ODE Solvers", Scientific Computing, R. S. Stepleman et al. (eds ), Vol 1 of IMACS Transactions on Scientific Computation, p. 55, North-Holland, Amsterdam, 1983) This integrator was developed at the Lawrence Livermore National Laboratory and has shown to be efficient in solving combustion problems.

Prior to calculating the critical $NO_x$ concentrations, the model was validated by comparing the results to that of pilot scale combustors (Sun, W. H., Hofmann, J. E., Pachaly, R., "Post Combustion $NO_x$ Reduction with Urea: Theory and Practice", Presented at the Seventh Annual International Pittsburgh Coal Conference, September, 1990). This demonstrated that the trend and the shape of the experimental nitrogen oxides reduction versus effluent temperature graph were well modelled. The calculated reduced $NO_x$ concentrations also agreed well with the experimental results. The critical $NO_x$ concentrations as a function of temperature at three baseline nitrogen oxides concentrations ($NO_{xi}$) are plotted, as shown in FIG. 1 As noted above, the critical nitrogen oxides concentration becomes significant for most practical purposes at effluent temperatures above about 1000° C. (1832° F.).

Figure 2:
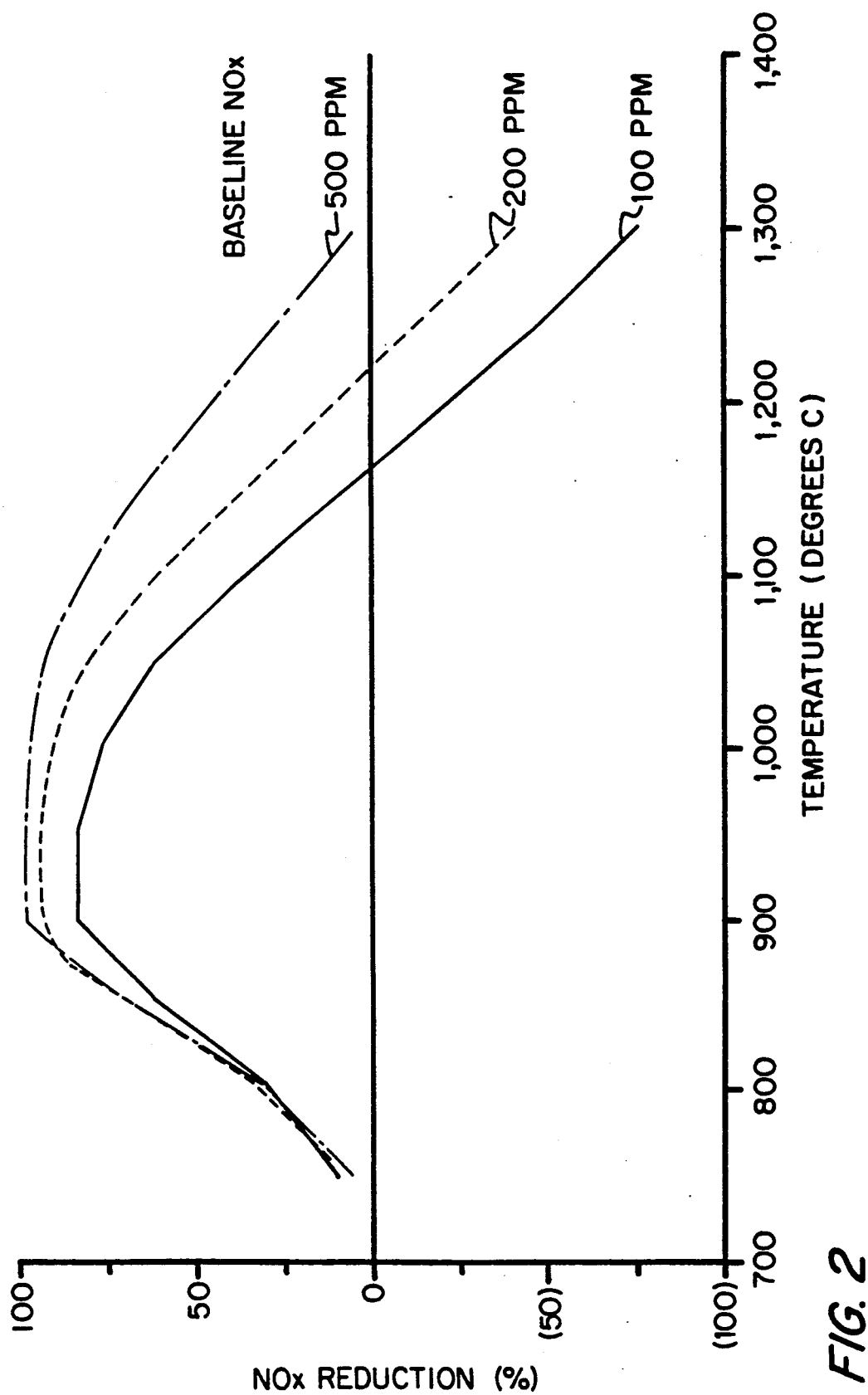
FIG. 2 is a graphical illustration of the effect of baseline nitrogen oxides levels on the nitrogen oxides reduction versus effluent temperature curve.

The baseline nitrogen oxides concentrations also affect the critical $NO_x$ concentrations, but primarily at temperatures above 1000° C. The baseline $NO_x$ concentrations affects $NO_x$ reductions in two ways: (1) the critical nitrogen oxides concentrations are higher with higher baseline nitrogen oxides, and (2) higher baseline $NO_x$ allows nitrogen oxides to be reduced at higher temperatures. In other words, higher $NO_x$ baselines shift the right side of the nitrogen oxides reduction versus temperature curve toward higher temperatures. A plot of the $NO_x$ reduction curve for three baseline $NO_x$ levels, as shown in FIG. 2, clearly shows the widening of the temperature window.

Unexpectedly, this lowest achievable nitrogen oxides concentration can be used to develop a methodology for $NO_x$ reduction, especially at high temperatures where the critical $NO_x$ level is more than negligible. Although there is a critical nitrogen oxides level throughout the effective temperature range of any nitrogenous treatment agent, even at effluent temperatures of 1500° F. and below, the lowest achievable nitrogen oxides concentration at these lower temperatures is relatively low, i.e., on the order of about 5 parts per million (ppm), depending on the other factors discussed above Even these low levels can be significant, though, depending on the desired nitrogen oxides concentration in the system.

At higher temperatures, such as about 1800° F. or 1900° F. where the critical $NO_x$ concentration can be somewhat greater, such as about 10 to 40 ppm, the lowest achievable nitrogen oxides concentration becomes more significant to the practitioner. At high temperatures, i.e., 2100° F. and higher where the lowest achievable nitrogen oxides concentration can be as high as about 100 to 200 ppm or higher, the critical $NO_x$ level is significant and most likely explains why reductions at such high temperatures were not before considered feasible or even possible.

Surprisingly, though, the inventive system is able to accomplish such reductions by first determining the lowest achievable nitrogen oxides concentration in the effluent at the location desired for introduction with the desired treatment agent by suitable means as discussed above The actual or baseline nitrogen oxides concentration in the effluent at that point is then determined by known means, such as by direct measurement of the effluent or through calculation using the boiler operating conditions (such as boiler load) if there is sufficiently detailed knowledge of the boiler system.

When this actual or baseline $NO_x$ level is higher than the lowest achievable nitrogen oxides concentration, $NO_x$ reductions are possible and a treatment agent is introduced so as to reduce the nitrogen oxides level in the effluent at least partially and most preferably entirely to the lowest achievable $NO_x$ concentration.

This is most advantageously done by determining the difference between the baseline nitrogen oxides level and the lowest achievable nitrogen oxides concentration (which difference represents the maximum achievable reduction of $NO_x$ at the existing effluent conditions using the intended treatment agent) by means such as a microprocessor, mathematic comparator or other suitable calculating means, and then introducing the treatment agent when the difference is a positive number in a manner effective to reduce nitrogen oxides by that amount or a lesser amount. If greater $NO_x$ reductions are attempted, the introduction will still not reduce $NO_x$ levels below the critical nitrogen oxides concentration and, thus, be ineffective to that extent.

For instance, the amount of urea needed to achieve the maximum reduction is determined by the difference between the baseline nitrogen oxides level and the critical $NO_x$ concentration. For a constant baseline $NO_x$ level, increasing the effective temperature increases the critical nitrogen oxides concentration and thus reduces the maximum achievable reduction at each temperature. The urea flowrate needed in order to close this "gap" between baseline and critical $NO_x$ levels, i.e., the maximum achievable reduction, as measured in normalized stoichiometric ratio (NSR) decreases as the achievable maximum reduction decreases as shown in Table 1. [The NSR is the ratio of the concentration of theoretically available reducing radicals such as $NH_2$ or NCO to the concentration of nitrogen oxides in the effluent. Alternatively, the molar ratio of the treatment agent to the nitrogen oxides concentration can be used in place of NSR when the chemistry of reduction is not well defined The term NSR as used herein will be understood to encompass molar ratios when appropriate].

TABLE 1

| Baseline $NO_x$ (ppm) | 200 | 200 | 200 | 200 |
|---|---|---|---|---|
| Injection Temperature (°F.) | 1652 | 1832 | 2012 | 2192 |
| Critical $NO_x$ Concentration (ppm) | 3 | 18 | 72 | 170 |
| Maximum Achievable | 197 | 182 | 128 | 30 |

TABLE 1-continued

| Reduction (ppm) | | | | |
|---|---|---|---|---|
| NSR Needed for Maximum Reduction | 2.5 | 2.0 | 1.5 | 0.8 |

The amount of urea required to achieve the maximum reduction decreases with the achievable reduction and additional urea does not give higher reductions. In fact, over-treatment can actually lead to an increase in the level of $NO_x$ for those cases where injection temperatures are higher than 2000° F., and thus lessens the achievable reduction.

Generally, when the difference between the baseline $NO_x$ concentration and the critical nitrogen oxides concentration is expressed as a percentage of the total nitrogen oxides in the effluent (i.e., baseline, when the difference is a positive number), the NSR of the treatment agent employed, whether urea, ammonia, or another nitrogenous or non-nitrogenous composition, is advantageously about 0.1 to about 5 times the difference. More advantageously, the NSR is about 0.5 to about 2 times the difference.

The system of the present invention can be combined into a multi-stage treatment regimen which will reduce effluent nitrogen oxides to a greater extent than previously contemplated. Such multi-stage processes are suggested in, for instance, U.S. Pat. No. 4,777,024 to Epperly, Peter-Hoblyn, Shulof, Jr., and Sullivan, as well as International Patent Application entitled "Multi-Stage Process for Reducing the Concentration of Pollutants in an Effluent", having Publication No. WO 89/02780, filed in the names of Epperly, Peter-Hoblyn, Shulof, Jr., and Sullivan on Aug. 12, 1988, the disclosures of each of which are incorporated herein by reference.

In a first stage of such a process, $NO_x$ is reduced at higher temperatures, such as above about 1900° F. using the inventive system as described above. In a second stage, the $NO_x$ is reduced at lower temperatures according to the process disclosed in the patents and applications cited above. By doing so, the advantages of the reduction of nitrogen oxides over a wider temperature range are obtained.

Example I

An ethylene cracker is operated such that the effluent temperature at the point of the nitrogen oxides reduction treatment is 1922° F. The baseline nitrogen oxides level in the effluent is varied by varying the heat input.

Figure 3:
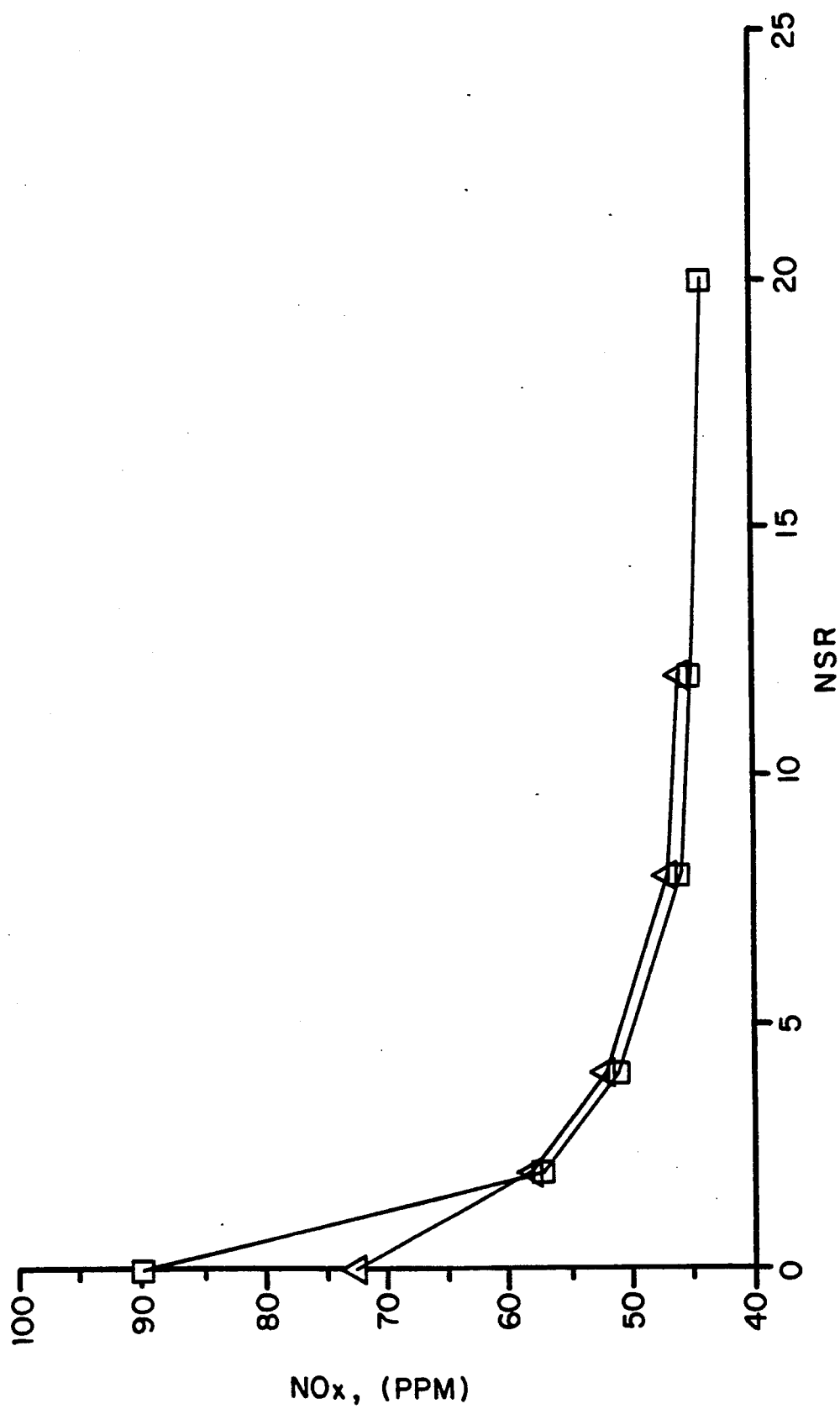
FIG. 3 is a graphical illustration of the results of Example I.

Nitrogen oxides are reduced by introducing a 10% aqueous solution of urea into the effluent at varying NSR's. The results are set out in Table 1 and graphically reproduced as FIG. 3.

TABLE 2

| Baseline $NO_x$ (ppm) | Final $NO_x$ (ppm) | NSR |
|---|---|---|
| 90 | 57 | 2 |
| 90 | 57 | 4 |
| 90 | 46 | 8 |
| 90 | 45 | 12 |
| 90 | 44 | 20 |
| 73 | 58 | 2 |
| 73 | 52 | 4 |
| 73 | 47 | 8 |
| 73 | 46 | 12 |

It can be seen that $NO_x$ reductions increased when higher $NO_x$ baseline levels were present, and that NSR had no significant effect on nitrogen oxides reductions when the critical $NO_x$ level is achieved.

Example II

A boiler fired with pulverized coal emits 250 ppm nitrogen oxides. A 10% solution of urea is injected at a location where the effluent temperature varies between 2000° F. and 2050° F. After about 0.2 seconds, the critical $NO_x$ level of 100 ppm is reached with negligible emission of byproducts carbon monoxide, ammonia, or nitrous oxide.

To reduce $NO_x$ emissions further, a 10% solution of urea is injected at a location where the effluent temperature is 1850° F. The urea injection rate is 50 ppm to achieve an additional reduction of 25 ppm, to 75 ppm, because chemical utilization is high at this temperature. Byproduct emissions are low because of the low treatment rate.

Accordingly, employment of a process of this invention can produce high reductions of nitrogen oxides with low byproduct emissions.

It is to be understood that the above Examples are given by way of illustration only and are not to be construed as limiting the invention.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for reducing nitrogen oxides in the effluent from the combustion of a carbonaceous fuel which is at a temperature of at least about 1900° V. using a nitrogenous treatment agent comprising urea, ammonia, cyanuric acid, ammonium carbamate, ammonium carbonate, mixtures of ammonia and ammonium bicarbonate, one or more of the hydrolysis products of urea or mixtures or complexes thereof, compounds which produce ammonia as a byproduct, ammonium formate, ammonium oxalate, hexamethylenetetramine, ammonium salts of organic acids, 5- or 6- membered heterocyclic hydrocarbons having at least one cyclic nitrogen, hydroxy amino hydrocarbons, amino acids, proteins, monoethanolamine, or mixtures thereof, the process comprising:
   (a) determining the lowest achievable nitrogen oxides concentration for said treatment agent at the conditions existing in the effluent at the point of introduction;
   (b) determining the baseline nitrogen oxides concentration at the point of introduction;
   (c) determining the amount by which the baseline nitrogen oxides concentration exceeds the lowest achievable nitrogen oxides concentration; and
   (d) introducing said treatment agent into the effluent under conditions effective to reduce the effluent nitrogen oxides concentration when said determined amount is a positive number.

2. The process of claim 1 wherein the conditions existing in the effluent used to determine said lowest achievable nitrogen oxides concentration comprise effluent temperature and concentration of hydroxyl radicals.

3. The process of claim 1 wherein said treatment agent is introduced at an NSR of about 0.1 to about 5 times the amount by which the baseline nitrogen oxides concentration exceeds the lowest achievable nitrogen oxides concentration when expressed as a percent of the total effluent nitrogen oxides concentration.

4. The process of claim 2 wherein said effluent temperature is at least 2100° F.

5. The process of claim 2 wherein said lowest achievable nitrogen oxide concentration is determined by the solution to the simultaneous nonlinear ordinary differential equations resulting from the flow model utilizing the following reaction set:

1. $H_2 + O_2 = 2OH$
2. $OH + H_2 = H_2O + H$
3. $O + OH = O_2 + H$
4. $O + H_2 = OH + H$
5. $H + O_2 + M = HO_2 + M$
6. $OH + HO_2 = H_2O + O_2$
7. $H + HO_2 = 2OH$
8. $O + HO_2 = O_2 + OH$
9. $2OH = O + H_2O$
10. $2H + M = H_2 + M$
11. $2H + H_2 = 2H_2$
12. $2H + H_2O = H_2 + H_2O$
13. $H + OH + M = H_2O + M$
14. $H + O + M = OH + M$
15. $2O + M = O_2 + M$
16. $H + HO_2 = H_2 + O_2$
17. $2HO_2 = H_2O_2 + O_2$
18. $H_2O_2 + M = 2OH + M$
19. $H_2O_2 + H = HO_2 + H_2$
20. $H_2O_2 + OH = H_2O + HO_2$
21. $NH + O_2 = HNO + O$
22. $NH + O_2 = NO + OH$
23. $NH + NO = N_2O + H$
24. $N_2O + H = N_2 + OH$
25. $N_2O + M = N_2 + O + M$
26. $N_2O + O = N_2 + O_2$
27. $N_2O + O = 2NO$
28. $N_2O + OH = N_2 + HO_2$
29. $NH + OH = HNO + H$
30. $NH + OH = N + H_2O$
31. $NH + N = N_2 + H$
32. $NH + H = N + H_2$
33. $NH + O = NO + H$
34. $NH_2 + O = HNO + H$
35. $NH_2 + O = NH + OH$
36. $NH_2 + OH = NH + H_2O$
37. $NH_2 + H = NH + H_2$
38. $NH_2 + NO = NNH + OH$
39. $NH_2 + NO = N_2 + H_2O$
40. $NH_3 + OH = NH_2 + H_2O$
41. $NH_3 + H = NH_2 + H_2$
42. $NH_3 + O = NH_2 + OH$
43. $NNH = N_2 + H$
44. $NNH + NO = N_2 + HNO$
45. $NNH + H = N_2 + H_2$
46. $NNH + OH = N_2 + H_2O$
47. $NNH + NH_2 = N_2 + NH_3$
48. $NNH + NH = N_2 + NH_2$
49. $NNH + O = N_2O + H$
50. $HNO + M = H + NO + M$
51. $HNO + OH = NO + H_2O$
52. $HNO + H = H_2 + NO$
53. $HNO + NH_2 = NH_3 + NO$

54. $2NHO = N_2O + H_2O$
55. $HNO + NO = N_2O + HO$
56. $N + NO = N_2 + O$
57. $N + O_2 = NO + O$
58. $N + OH = NO + H$
59. $HO_2 + NO = NO_2 + OH$
60. $NO_2 + H = NO + OH$
61. $NH_2 + NH = N_2H_2 + H$
62. $2NH = N_2 + 2H$
63. $NH_2 + N = N_2 + 2H$
64. $N_2H_2 + M = NNH + H + M$
65. $N_2H_2 + H = NNH + H_2$
66. $N_2H_2 + O = NH_2 + NO$
67. $N_2H_2 + O = NNH + OH$
68. $N_2H_2 + OH = NNH + H_2O$
69. $N_2H_2 + NO = N_2O + NH_2$
70. $N_2H_2 + NH = NNH + NH_2$
71. $N_2H_2 + NH_2 = NH_3 + NNH$
72. $2NH_2 = N_2H_2 + H_2$
73. $NH_2 + O_2 = HNO + OH$
74. $CO + O + M = CO_2 + M$
75. $CO + OH = CO_2 + H$
76. $CO + O_2 = CO_2 + O$
77. $HO_2 + CO = CO_2 + OH$
78. $2H + CO_2 = H_2 + CO_2$
79. $NCO + H = NH + CO$
80. $NCO + O = NO + CO$
81. $NCO + N = N_2 + CO$
82. $NCO + OH = NO + CO + H$
83. $NCO + M = N + CO + M$
84. $NCO + NO = N_2O + CO$
85. $NCO + H_2 = HNCO + H$
86. $HNCO + M = NH + CO + M$
87. $H + HNCO = NH_2 + CO$
88. $NH + HNCO = NH_2 + NCO$
89. $NH_2 + HNCO = NH_3 + NCO$
90. $OH + HNCO = NCO + H_2O$
91. $O + HNCO = NH + CO_2$
92. $CON_2H_4 = NH_3 + HNCO$

6. The process of claim 1 wherein the baseline nitrogen oxides concentration at the point of introduction is determined by direct measurement.

7. The process of claim 1 wherein said treatment agent is introduced into the effluent at a concentration and rate calculated to reduce the effluent nitrogen oxides concentration to the lowest achievable nitrogen oxides concentration.

8. A multi-stage process for reducing the nitrogen oxides concentration in the oxygen-rich effluent from the combustion of a carbonaceous fuel comprising:
(a) a first stage which comprises
  i. determining the lowest achievable nitrogen oxides concentration for a nitrogenous treatment agent comprising urea, ammonia, cyanuric acid, ammonium carbamate, ammonium carbonate, mixtures of ammonia and ammonium bicarbonate, one or more of the hydrolysis products of urea or mixtures or complexes thereof, compounds which produce ammonia as byproduct, ammonium formate, ammonium oxalate, hexamethylenetetramine, ammonium salts of organic acids, 5- or 6-membered heterocyclic hydrocarbons having at least one cyclic nitrogen, hydroxy amino hydrocarbons, amino acids, proteins, monoethanolamine, or mixtures thereof at the conditions existing in the effluent at the point of introduction, where the effluent is at a temperature of at least about 1900° F.;
  ii. determining the baseline nitrogen oxides concentration at the point of introduction;
  iii. determining the amount by which the baseline nitrogen oxides concentration exceeds the lowest achievable nitrogen oxides concentration; and
  iv. introducing said treatment agent into the effluent under conditions effective to reduce the effluent nitrogen oxides concentration when said determined amount is a positive number; and
b) a second stage which comprises introducing a nitrogenous treatment agent into the effluent at an effluent temperature below about 1900° F. under conditions effective to further reduce nitrogen oxides in the effluent.

9. The process of claim 8 wherein said nitrogenous treatment agent of said second stage comprises urea, ammonia, cyanuric acid, ammonium carbamate, ammonium carbonate, mixtures of ammonia and ammonium bicarbonate, ammonium formate, or ammonium oxalate.

* * * * *

UNITED STATES PATENT AND TRADEMARK OFFICE
CERTIFICATE OF CORRECTION

PATENT NO. : 5,229,090
DATED : July 20, 1993
INVENTOR(S) : John E. Hofmann, et al.

It is certified that error appears in the above-indentified patent and that said Letters Patent is hereby corrected as shown below:

At column 1, line 29, insert --.-- immediately after "processes".
At column 1, line 37, insert --.-- immediately after "high".
At column 1, line 39, insert --.-- immediately after "boiler".
At column 1, line 47, delete "." immediately after "F".
At column 1, line 49, insert --.-- immediately after "avoided".
At column 1, line 62, delete "." immediately after "F".
At column 1, line 66, delete "." immediately after "F".
At column 2, line 22, insert --.-- immediately after "monoxide".
At column 3, line 14, insert --.-- immediately after "(SNCR)".
At column 3, line 39, "WO 89/I0182" should read --WO 89/10182--.
At column 3, line 46, "entitaled" should read --entitled--.
At column 4, line 16, insert --.-- immediately after "produced".
At column 4, line 49, insert --.-- immediately after "(CO)".
At column 4, line 61, insert --.-- immediately after "place".
At column 5, line 44, insert --.-- immediately after "tration".
At column 5, line 53, insert --.-- immediately after "further".
At column 6, line 4, insert --.-- immediately after "artisan".
At column 6, line 19, insert --.-- immediately after "burned".
At column 6, line 29, insert --.-- immediately after "reaction".
At column 8, line 40, delete "." immediately after "C".
At column 8, line 40, delete "." immediately after "F".
At column 8, line 62, delete "." immediately after "F".

UNITED STATES PATENT AND TRADEMARK OFFICE
CERTIFICATE OF CORRECTION

PATENT NO. : 5,229,090
DATED : July 20, 1993
INVENTOR(S) : John E. Hofmann, et al.

It is certified that error appears in the above-indentified patent and that said Letters Patent is hereby corrected as shown below:

```
At column 8, line 66, insert --.-- immediately after "above".
At column 9, line 1, delete "." immediately after "F".
At column 9, line 2, delete "." immediately after "F".
At column 9, line 6, delete "." immediately after "F".
At column 9, line 17, insert --.-- immediately after "above".
At column 9, line 61, insert --.-- immediately after "defined".
At column 9, line 66, delete "." immediately after "F".
At column 10, line 12, delete "." immediately after "F".
At column 10, line 38, delete "." immediately after "F".
At column 11, line 8, delete "." immediately after "F".
At column 11, line 38, "V" should read --F--.
At column 14, line 24, delete "." immediately after "F".
At column 14, line 37, delete "." immediately after "F".
```

Signed and Sealed this

Fifteenth Day of March, 1994

Attest:

BRUCE LEHMAN

Attesting Officer

Commissioner of Patents and Trademarks